July 12, 1932. G. A. JOHNSON 1,866,710
BRAKE BEAM SAFETY SUPPORT
Filed July 25, 1930
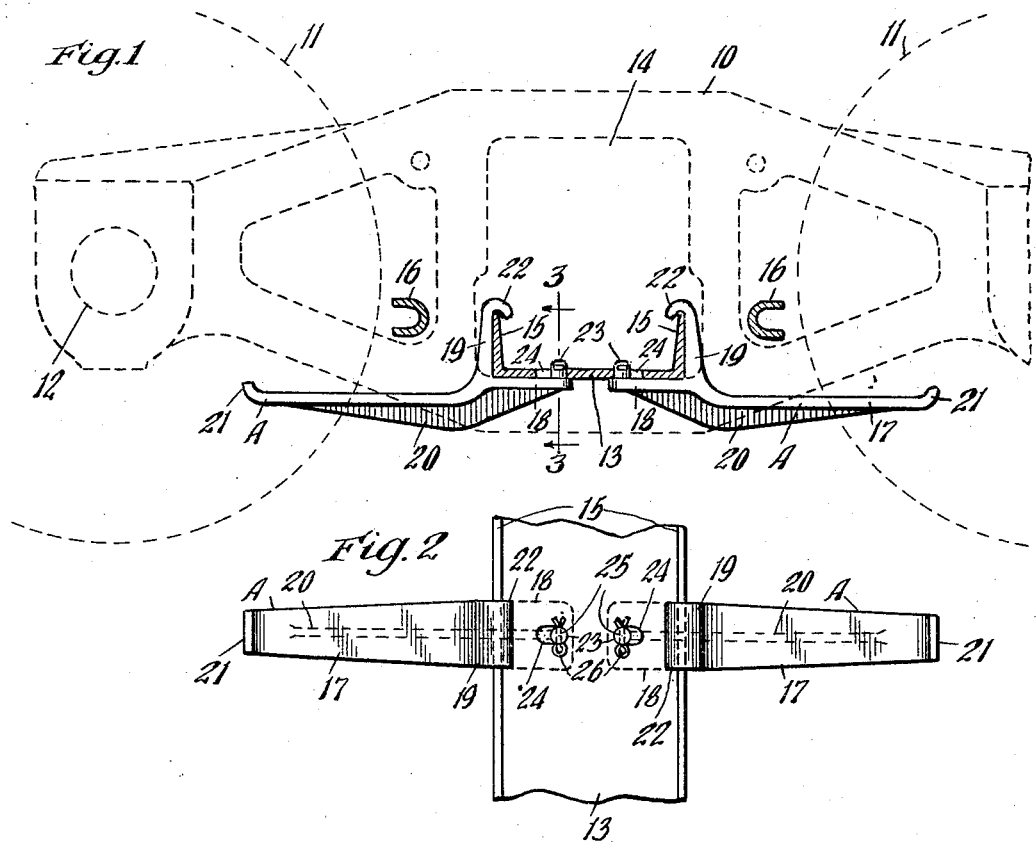
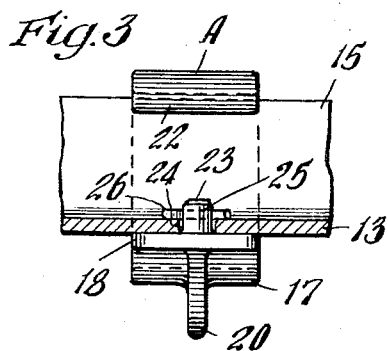
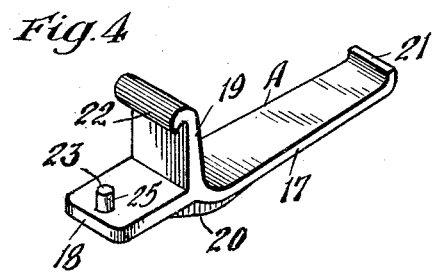
Inventor
George A. Johnson
By Joseph Harris
His Atty.
Witness
Wm. Geiger Patented July 12, 1932

1,866,710

UNITED STATES PATENT OFFICE

GEORGE A. JOHNSON, OF CHICAGO, ILLINOIS, ASSIGNOR TO W. H. MINER, INC., OF CHICAGO, ILLINOIS, A CORPORATION OF DELAWARE

BRAKE BEAM SAFETY SUPPORT

Application filed July 25, 1930. Serial No. 470,560.

This invention relates to improvements in brake beam safety supports, especially for use in connection with railway cars and locomotive tenders.

In car construction, it is the usual practice to provide an auxiliary or safety means for supporting the usual brake beams in case they become accidentally detached, to prevent dropping of the same on the rails, which usually results in derailments and serious accidents. Failure of such safety devices often occurs due to the same becoming loosened and accidentally detached through the vibrations to which the parts are subject in service.

One object of my invention is to provide a simple and efficient safety supporting means for brake beams, which may be readily applied and is securely held in supporting position, thereby overcoming the defects hereinbefore pointed out.

Another object of the invention is to provide a brake beam safety supporting means which is of rugged construction, which has means thereon interlocking with the member to which it is secured to effectively hold the same in permanent supporting position.

A more specific object of the invention is to provide a brake beam safety support in the form of a bracket attached to the usual spring plank of a railway car truck and having a supporting arm extending beneath the brake beam member, wherein the bracket has hooked engagement with the corresponding upstanding flange of the spring plank, and is further provided with a securing lug or finger having shouldered engagement with the spring plank proper to effectively hold the bracket against shifting lengthwise of the plank.

Another object of the invention is to provide a safety supporting means for brake beams comprising a plurality of like one piece supporting brackets, which may be cheaply manufactured, by casting or forging operations, and each bracket when applied forms in itself a complete supporting member.

Other objects of the invention will more clearly appear from the description and claims hereinafter following.

In the drawing, forming a part of this specification, Figure 1 is a transverse, vertical, sectional view through a portion of the truck structure of a railway car, illustrating my improvements in connection therewith, the truck structure and associated parts being illustrated in dotted lines. Figure 2 is a top plan view of a portion of the spring plank of the truck member, illustrating my improved safety supporting means attached thereto, the latter also being shown in plan. Figure 3 is a vertical, sectional view corresponding substantially to the line 3—3 of Figure 1, said view being on an enlarged scale. And Figure 4 is a detailed, perspective view of one of the bracket members comprised in my improved safety supporting means.

In said drawing, 10 designates generally the side frame member of the truck structure, 11—11 the car wheels and 12 the axle member. The usual spring plank is indicated by 13 and is accommodated in the usual openings 14 provided in the side frame structure of the truck. The ordinary spring members, which cooperate with the plank 13 and associated parts in a well known manner, are not illustrated in the drawing. The spring plank 13 is of channel form having upstanding flanges 15—15 at the opposite longitudinal side edges thereof. The brake beam members are indicated by 16—16 and are disposed in the usual position at opposite sides of the spring plank member 13. As will be understood, the brake beams 16 have the usual brake shoes connected thereto, not shown, which cooperate with the wheels 11 of the truck. The brake beams 16 are supported from the truck structure in the usual manner.

In carrying out my invention, I provide a plurality of brackets A—A, which may be either in the form of castings or forgings and are mounted on the spring plank 13 of the truck, at opposite sides of the latter in pairs. Each bracket A comprises an elongated, horizontally disposed outstanding bar-like arm 17, an inwardly projecting plate-like flange or shelf 18 and an upstanding vertical plate-like arm 19. The bar-like member 17 and arms 18 and 19 are all formed integral. As most clearly shown in Figures 1 and 4, the arm or bar 17 is disposed in a plane slightly below the arm 18 and said arms 17 and 18 are reinforced by a longitudinally extending web or rib 20 on the bottom sides thereof. At the outer end, the arm 17 is bent upwardly, as indicated at 21, to provide a retaining rib or flange. The vertical arm 19 terminates in a hook-like portion 22 at the upper end thereof, which engages over the corresponding flange 15 of the spring plank. The horizontal arm 18 extends beneath the main body portion of the spring plank and abuts the bottom face of the same, as clearly shown in Figure 1, thereby holding the bracket in position when the hooked portion 22 is engaged over the flange 15 of the spring plank. At the inner end, the arm 18 is provided with an upstanding cylindrical boss or finger 23 which extends through an opening 24 provided in the horizontal web portion of the spring plank. As most clearly shown in Figure 1, the lug 23 is of such a length that it projects entirely through the horizontal web of the spring plank and is provided with a cotter pin receiving opening 25 at the upper end thereof through which a cotter pin 26 is engaged to permanently secure the bracket A in position.

As hereinbefore mentioned, the brackets are arranged in pairs adjacent opposite ends of the spring plank, the spring plank being provided with two openings 24 through the horizontal web portion thereof at each side of the truck, thereby accommodating the lugs on two of the brackets, which are disposed at opposite sides of the spring plank. The arms 17 of the brackets underlie the brake beam members 16, as clearly shown in Figure 1, and are of such a length that they extend a considerable distance beyond the same. By this arrangement when either of the brake beams 16 or both become accidentally detached and drop from the position shown in Figure 1, they will be arrested by engagement with the corresponding arms 17 of the brackets and thus prevented from dropping onto the rails, thus avoiding derailments and other accidents.

In applying the brackets in supporting position to the truck structure, the hooked end 22 is first engaged over the corresponding flange 15 of the spring plank and the bracket is rocked downwardly and inwardly on said hooked end until the arm 18 engages the bottom side of the spring plank. During this operation, the lug or finger 23 is engaged through the opening or seat 24. As clearly shown in Figure 1, the openings 24 are slightly elongated so as to provide clearance to facilitate entrance of the lugs in said openings while the bracket is being applied. After the bracket is in position, the cotter pins are applied to secure the same. As will be evident, the arm 17 of each bracket being relatively long provides weighted means for holding the arm 18 engaged with the bottom side of the spring plank, thereby holding the finger or lug engaged within the corresponding seat or opening of the spring plank. Further, in case the brake beam drops onto the arm 17 and is supported thereby, the weight of the brake beam will tend to force the arm 18 more tightly against the bottom of the spring plank, thereby holding the same in position. Longitudinal movement of the brackets A on the spring plank is effectively prevented by the upstanding lugs or fingers thereon which engage within the seats provided in the bottom web of the plank.

As will be evident from the preceding description taken in connection with the drawing, I have provided an exceedingly simple and efficient means for effectively supporting the brake beams of a truck member in case of accidental detachment of the beams, which may be inexpensively manufactured by simple casting or forging operations. Further, each bracket which forms in itself a complete brake beam safety supporting means is effectively locked to the spring plank in such a manner that it will not be affected by vibrations of the truck structure in service and will indefinitely be maintained in its operative supporting position.

I have herein shown and described what I now consider the preferred manner of carrying out my invention, but the same is merely illustrative and I contemplate all changes and modifications that come within the scope of the claims appended hereto.

I claim:

1. A one piece brake beam supporting casting having a bar-like horizontal arm adapted to underlie the brake beam, a horizontal inwardly extending supporting flange formed integral therewith and adapted to engage beneath the spring plank of a truck member, and an upstanding plate-like section integral with said arm and flange and adapted to abut the upstanding side flange of the channel-shaped spring plank member, said plate-like section having a hook-like upper end portion adapted to engage over the upper edge of said side flange, said horizontal supporting flange having an upstanding cylindrical lug integral therewith and engaging in a seat on said spring plank for locking the casting thereto.

2. A safety supporting member for brake beams of railway cars adapted to be attached to the spring plank of the car truck, the spring plank having upstanding longitudinal edge flanges, said member comprising a one piece rigid bracket having a hooked portion engaging over the upper edge of one of the flanges of the spring plank, an outwardly extending substantially horizontal arm adapted to underlie the brake beam and an inwardly extending arm engaging beneath the spring plank, said last named arm having a lug thereon seated in an opening in the spring plank and extending through the spring plank, said lug being of smaller cross-sectional size than said opening to permit engagement of said lug therethrough while the hook is engaged with the flange of the spring plank, and a detachable securing element engaged through the outer end of said lug having shouldered engagement with the inner side of the spring plank to secure said bracket against removal.

In witness that I claim the foregoing I have hereunto subscribed my name this 15th day of July 1930.

GEORGE A. JOHNSON.